US010219180B2

(12) United States Patent
Yang et al.

(10) Patent No.: US 10,219,180 B2
(45) Date of Patent: Feb. 26, 2019

(54) CARRIER AGGREGATION METHOD AND APPARATUS FOR COMMUNICATION SYSTEM

(71) Applicant: ZTE CORPORATION, Shenzhen (CN)

(72) Inventors: Weiwei Yang, Shenzhen (CN); Bo Dai, Shenzhen (CN); Chunli Liang, Shenzhen (CN); Shuqiang Xia, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 51 days.

(21) Appl. No.: 15/321,787

(22) PCT Filed: Oct. 11, 2014

(86) PCT No.: PCT/CN2014/088425
§ 371 (c)(1),
(2) Date: Apr. 7, 2017

(87) PCT Pub. No.: WO2015/196628
PCT Pub. Date: Dec. 30, 2015

(65) Prior Publication Data
US 2017/0289852 A1    Oct. 5, 2017

(30) Foreign Application Priority Data

Jun. 24, 2014  (CN) .......................... 2014 1 0289700

(51) Int. Cl.
*H04W 4/00* (2018.01)
*H04W 28/18* (2009.01)
(Continued)

(52) U.S. Cl.
CPC ............... *H04W 28/18* (2013.01); *H04L 1/16* (2013.01); *H04L 5/001* (2013.01); *H04L 5/0055* (2013.01);
(Continued)

(58) Field of Classification Search
CPC .................................................... H04W 28/18
See application file for complete search history.

(56) References Cited

U.S. PATENT DOCUMENTS 9,172,519 B2    10/2015  Seo et al.
9,425,942 B2     8/2016  Oizumi et al.
(Continued)

FOREIGN PATENT DOCUMENTS

CN    103444118 A    12/2013
CN    103563436 A     2/2014
(Continued)

OTHER PUBLICATIONS

PCT International Search Report dated Mar. 4, 2015, Application No. PCT/CN2014/088425, 3 Pages.
(Continued)

*Primary Examiner* — Chi H Pham
*Assistant Examiner* — Fahmida S Chowdhury
(74) *Attorney, Agent, or Firm* — Plumsea Law Group, LLC

(57) ABSTRACT

The present disclosure discloses a Carrier Aggregation (CA) method and device for a communication system. Herein, the CA method for the communication system includes that: multiple serving cells with subframe deviations are aggregated to obtain K Primary Cells (PCells) and M Secondary Cells (SCells), herein K and M are positive integers; and a transmission node transmits information on the multiple aggregated serving cells according to the subframe deviations.

16 Claims, 17 Drawing Sheets

(51) Int. Cl.
  *H04L 1/16* (2006.01)
  *H04L 5/00* (2006.01)
  *H04L 5/14* (2006.01)
  *H04W 28/02* (2009.01)
  *H04W 48/16* (2009.01)
  *H04W 72/08* (2009.01)
  *H04W 88/10* (2009.01)

(52) U.S. Cl.
  CPC ....... *H04L 5/1469* (2013.01); *H04W 28/0215* (2013.01); *H04W 48/16* (2013.01); *H04W 72/08* (2013.01); *H04W 28/0247* (2013.01); *H04W 28/0289* (2013.01); *H04W 88/10* (2013.01)

(56) References Cited

U.S. PATENT DOCUMENTS

| | | | | |
|---|---|---|---|---|
| 2011/0134774 | A1* | 6/2011 | Pelletier | H04W 52/365 370/252 |
| 2013/0315114 | A1 | 11/2013 | Seo et al. | |
| 2014/0153449 | A1* | 6/2014 | Seo | H04L 1/1607 370/280 |
| 2016/0156455 | A1* | 6/2016 | Park | H04L 5/14 370/280 |
| 2016/0308659 | A1* | 10/2016 | Wang | H04L 5/14 |

FOREIGN PATENT DOCUMENTS

| | | |
|---|---|---|
| CN | 103582113 A | 2/2014 |
| CN | 104079390 A | 10/2014 |
| EP | 2688237 A2 | 1/2014 |
| EP | 2739107 A1 | 6/2014 |
| WO | 2013067430 A1 | 5/2013 |

OTHER PUBLICATIONS

PCT Written Opinion of the International Searching Authority dated Mar. 4, 2015, Application No. PCT/CN2014/088425, Applicant ZTE Corporation, 6 Pages.

Ericsson et al., "UE Behaviour for Transmission after Measurement Gaps in TDD", 3GPP TSG RAN WG4 Meeting #68, Barcelona, Spain, Aug. 19-23, 2013, R4-133916, pp. 1-7.

Extended European Search Report dated Jun. 8, 2017, Application No. 14895963.8-1875 / 3163781, Applicant ZTE Corporation, 9 Pages.

* cited by examiner

CARRIER AGGREGATION METHOD AND APPARATUS FOR COMMUNICATION SYSTEM

CROSS-REFERENCE TO RELATED APPLICATIONS

This application is a U.S. national phase of PCT Application No. PCT/CN2014/088425 filed on Oct. 11, 2014, which claims priority to Chinese Patent Application No. 201410289700.7 filed on Jun. 24, 2014, the disclosures of which are incorporated in their entirety by reference herein.

TECHNICAL FIELD

The present disclosure relates to the field of communication, and more particularly to a Carrier Aggregation (CA) method and device for a communication system.

BACKGROUND

Radio frames in a Long Term Evolution (LTE) system include frame structures in a Frequency Division Duplex (FDD) mode and a Time Division Duplex (TDD) mode. As shown in FIG. 1, in a frame structure in the FDD mode, a 10 ms radio frame consists of 20 time slots which are 0.5 ms long and numbered as 0~19, and time slots $2i$ and $2i+1$ form a subframe i (herein, $0 \leq i \leq 9$) with a length of 1 ms. As shown in FIG. 2, in a frame structure in the TDD mode, a 10 ms radio frame consists of two half frames with lengths of 5 ms, one half frame includes 5 subframes with lengths of 1 ms, and subframe i is defined into a combination of two time slots $2i$ and $2i+1$ with lengths of 0.5 ms (herein, $0 \leq i \leq 9$). An uplink and downlink configuration supported by each subframe is shown in Table 1, herein "D" represents a subframe dedicated to downlink transmission, "U" represents a subframe dedicated to uplink transmission, and "S" represents a special subframe configured for three domains, i.e. a Downlink Pilot Time Slot (DwPTS), a Guard Period (GP) and an Uplink Pilot Time Slot (UpPTS).

TABLE 1

Schematic Table for Uplink and Downlink Configuration Supported by Each Subframe

| Uplink-downlink configuration | Downlink-uplink switch point period | Subframe number# | | | | | | | | | |
|---|---|---|---|---|---|---|---|---|---|---|---|
| | | 0 | 1 | 2 | 3 | 4 | 5 | 6 | 7 | 8 | 9 |
| #0 | 5 ms | D | S | U | U | U | D | S | U | U | U |
| #1 | 5 ms | D | S | U | U | D | D | S | U | U | D |
| #2 | 5 ms | D | S | U | D | D | D | S | U | D | D |
| #3 | 10 ms | D | S | U | U | U | D | D | D | D | D |
| #4 | 10 ms | D | S | U | U | D | D | D | D | D | D |
| #5 | 10 ms | D | S | U | D | D | D | D | D | D | D |
| #6 | 5 ms | D | S | U | U | U | D | S | U | U | D |

From the above table, it can be seen that LTE TDD supports uplink and downlink switch periods of 5 ms and 10 ms. If a downlink-to-uplink switch point period is 5 ms, a special subframe may exist in two half frames; if the downlink-to-uplink switch point period is 10 ms, the special subframe only exists in the first half frame; subframe #0, subframe #5 and a DwPTS are always configured for downlink transmission; and an UpPTS and a subframe following a special subframe are dedicated to uplink transmission.

In an LTE FDD system, sending of a Physical Downlink Shared Channel (PDSCH) and corresponding Hybrid Automatic Repeat Request-Acknowledgement (HARQ-ACK) information in a downlink Hybrid Automatic Repeat Request (HARQ) is required to follow the following timing specification, that is, a timing relationship of the downlink HARQ is required to follow the following specification: when User Equipment (UE) detects transmission of a PDSCH or a Physical Downlink Control Channel (PDCCH) indicating downlink Semi-Persistent Scheduling (SPS) release in subframe n–4, the UE transmits corresponding HARQ-ACK information on uplink subframe n, that is, a feedback delay of the downlink HARQ is 4; and in a an LTE TDD system, a timing relationship of a downlink HARQ is required to follow the following specification: when UE detects transmission of a PDSCH or a PDCCH indicating downlink Semi-Persistent Scheduling SPS release in subframe n–k, the UE transmits corresponding HARQ-ACK information in uplink subframe n, herein k belongs to K, K is a $\{k_0, k_1, \ldots, K_{m-1}\}$, M is the total number of K, a maximum value of M is 4, a value corresponding to k is a feedback delay of the downlink HARQ, and values of K in different uplink and downlink configurations are shown in Table 2. From Table 2, it can be seen that the feedback delay of the downlink HARQ of the TDD system is more than or equal to the feedback delay 4 of the downlink HARQ of the LTE FDD system.

TABLE 2

Downlink Related Group Index K: $\{k_0, k_1, \ldots, K_{m-1}\}$ in TDD System

| Uplink-downlink configuration | Subframe number n | | | | | | | | | |
|---|---|---|---|---|---|---|---|---|---|---|
| | 0 | 1 | 2 | 3 | 4 | 5 | 6 | 7 | 8 | 9 |
| #0 | — | — | 6 | — | 4 | — | — | 6 | — | 4 |
| #1 | — | — | 7, 6 | 4 | — | — | — | 7, 6 | 4 | — |
| #2 | — | — | 8, 7, 4, 6 | — | — | — | — | 8, 7, 4, 6 | — | — |
| #3 | — | — | 7, 6, 11 | 6, 5 | 5, 4 | — | — | — | — | — |
| #4 | — | — | 12, 8, 7, 11 | 6, 5, 4, 7 | — | — | — | — | — | — |
| #5 | — | — | 13, 12, 9, 8, 7, 5, 4, 11, 6 | — | — | — | — | — | — | — |
| #6 | — | — | 7 | 7 | 5 | — | — | 7 | 7 | — |

In order to meet a requirement of the International Telecommunication Union-Advanced (ITU-Advanced), a Long Term Evolution Advanced (LTE-A) system, as an evolved standard of LTE, is required to support a larger system bandwidth (capable of maximally reaching 100 MHz), and is also required to be backwards compatible with an existing LTE standard. On the basis of an existing LTE system, a bandwidth of the LTE system may be combined to obtain a larger bandwidth, such a technology is called a Carrier Aggregation (CA) technology, and this technology can increase a spectrum utilization rate of an International Mobile Telecommunications-Advance (IMT-Advance) system, alleviate spectrum resource shortage and further optimize utilization of a spectrum resource.

In a system with Carrier Aggregation introduced, an aggregated carrier is called a Component Carrier (CC), and is also called a serving cell. Meanwhile, concepts of Primary Component Carrier/Cell (PCC/PCell) and Secondary Component Carrier/Cell (SCC/SCell) are also disclosed, and a system where Carrier Aggregation is performed at least includes a PCell and an SCell, herein the PCell is kept in an active state. In an existing Carrier Aggregation technology, FDD serving cell aggregation is supported, and a corresponding downlink HARQ feedback delay is 4. TDD serving cell aggregation under the same uplink and downlink configuration is supported, and TDD serving cell aggregation under different uplink and downlink configurations is also supported. For TDD serving cell aggregation, a corresponding downlink HARQ feedback delay is k, and a value of k is shown in Table 2. In terms of feedback delay, a feedback delay of an existing Carrier Aggregation TDD system is more than or equal to that of a Carrier Aggregation FDD system.

For the problem that a feedback delay of a Carrier Aggregation TDD system is more than or equal to that of a Carrier Aggregation FDD system in a related technology, there has been no effective solution yet.

SUMMARY

For the problem that a feedback delay of a Carrier Aggregation TDD system is more than or equal to that of a Carrier Aggregation FDD system, the present disclosure provides a Carrier Aggregation method and device for a communication system, so as to at least solve the problem.

According to one aspect of the present disclosure, a Carrier Aggregation method for a communication system is provided, which includes that: multiple serving cells with existence of subframe deviations are aggregated to obtain K PCells and M SCells, herein K and M may be positive integers; and a transmission node transmits information in the multiple serving cells according to the subframe deviations.

In an exemplary embodiment, the subframe deviations includes: corresponding subframe index difference values between the serving cells in the same radio frame index, or difference values of subframes where synchronization channels are located between the multiple serving cells.

In an exemplary embodiment, existence of the subframe deviations includes: existence of the subframe deviations between the serving cells with adjacent cell indexes in the multiple serving cells; or existence of the subframe deviations between the multiple serving cells and a fixed serving cell, herein the fixed serving cell may be a serving cell in the multiple serving cells.

In an exemplary embodiment, the fixed serving cell may be one of: a serving cell serving as a PCell, a serving cell with a maximum subframe index and a serving cell predefined by the transmission node.

In an exemplary embodiment, the multiple serving cells includes: FDD serving cells and/or TDD serving cells.

In an exemplary embodiment, the transmission node includes a Node B and a terminal; the step that the transmission node transmits the information in multiple preset carriers according to the deviations includes that: the terminal transmits the information in the multiple serving cells according to the subframe deviations; and/or the Node B performs information scheduling in the multiple serving cells according to the subframe deviations, and transmits the information according to scheduling.

In an exemplary embodiment, before the step that the terminal transmits the information in the multiple serving cells according to the subframe deviations, the method further includes that: the terminal acquires the subframe deviations according to at least one of the following operation that: the terminal acquires the subframe deviations through signaling; the terminal acquires the subframe deviations by detecting locations of the synchronization channels corresponding to the multiple serving cells; and the subframe deviations are acquired by virtue of uplink and downlink configurations corresponding to the multiple serving cells.

In an exemplary embodiment, when the subframe deviations are acquired by virtue of the uplink and downlink configurations corresponding to the multiple serving cells, the subframe deviations includes at least one of that: when the uplink and downlink configuration of a PCell is #0 and the uplink and downlink configuration of an SCell is #1, the subframe deviation is 3; when the uplink and downlink configuration of the PCell is #1 and the uplink and downlink configuration of the SCell is #0, the subframe deviation is 2; when the uplink and downlink configuration of the PCell is #2 and the uplink and downlink configuration of the SCell is #0, the subframe deviation is 2; when the uplink and downlink configuration of the PCell is #3 and the uplink and downlink configuration of the SCell is #6, the subframe deviation is 3; when the uplink and downlink configuration of the PCell is #4 and the uplink and downlink configuration of the SCell is #0, the subframe deviation is 2; when the uplink and downlink configuration of the PCell is #5 and the uplink and downlink configuration of the SCell is #0, the subframe deviation is 2; when the uplink and downlink configuration of the PCell is #6 and the uplink and downlink configuration of the SCell is #1, the subframe deviation is 3; when the uplink and downlink configuration of the PCell is #6 and the uplink and downlink configuration of the SCell is #0, the subframe deviation is 2; when the uplink and downlink configuration of the PCell is one of #0, #3 and #6, the subframe deviation is 3; and when the uplink and downlink configuration of the PCell is one of #1, #2, #4 and #5, the subframe deviation is 2.

In an exemplary embodiment, the step that the terminal transmits the information in the multiple serving cells according to the subframe deviations includes that:

under the condition that there are corresponding uplink subframes under each subframe index, if transmission of a Physical Downlink Shared Channel (PDSCH) corresponding to a Physical Downlink Control Channel/Enhanced Physical Downlink Control Channel (PDCCH/EPDCCH) or a PDCCH/EPDCCH indicating Semi-Persistent Scheduling (SPS) release or no PDSCH corresponding to the PDCCH/EPDCCH is detected on PCell subframe n, or transmission of the PDSCH corresponding to the PDCCH/EPDCCH is detected on SCell subframe n, the terminal sends a corresponding Hybrid Automatic Repeat Request-Acknowledgement (HARQ-ACK) on uplink subframe n+4, herein when a PCell and SCell corresponding to subframe n+4 are both uplink subframes, the terminal sends the HARQ-ACK in the PCell;

when the PCell corresponding to subframe n+4 is an uplink subframe and the SCell is a downlink subframe, the terminal sends the HARQ-ACK in the PCell; and when the SCell corresponding to subframe n+4 is an uplink subframe and the PCell is a downlink subframe, the HARQ-ACK may be sent in the SCell.

In an exemplary embodiment, the step that the terminal transmits the information in the multiple serving cells according to the subframe deviations includes that:

when there are corresponding downlink subframes and uplink subframes under each subframe index, if Downlink Control Information (DCI) corresponding to transmission of a Physical Uplink Shared Channel (PUSCH) is detected in subframe n, the terminal transmits the PUSCH in subframe n+4, herein selection of the serving cell where the DCI is located includes at least one of that:

when there is no cross-carrier scheduling configured and a carrier corresponding to the PUSCH transmitted in subframe n+4 has a downlink subframe in subframe n, the DCI is transmitted in the same serving cell as that of PUSCH;

when there is no cross-carrier scheduling configured and the carrier corresponding to the PUSCH transmitted in subframe n+4 does not have the downlink subframe in subframe n, the DCI is transmitted in a different serving cell from that of PUSCH, and the terminal determines the serving cell where the DCI is located according to at least one of a timing deviation, an uplink and downlink proportion of the aggregated serving cells and high-layer signaling; and when cross-carrier scheduling is configured, the carrier where the DCI corresponding to the PUSCH is located is determined according to the configuration.

In an exemplary embodiment, the step that the terminal transmits the information in the multiple serving cells according to the subframe deviations includes that:

when there are corresponding downlink subframes and uplink subframes under each subframe index, the terminal sends a PUSCH in subframe n, and detects a Physical Hybrid ARQ Indicator or Channel (PHICH) corresponding to the PUSCH in subframe n+4, herein selection of the serving cell where the PHICH is located includes at least one of that:

when there is no cross-carrier scheduling configured and a carrier corresponding to the PUSCH transmitted in subframe n has a downlink subframe in subframe n+4, the PHICH is transmitted in the same serving cell as that of PUSCH;

when there is no cross-carrier scheduling configured and the carrier corresponding to the PUSCH transmitted in subframe n+4 does not have the downlink subframe in subframe n, the PHICH is transmitted in a different serving cell from that of PUSCH, and the terminal determines the serving cell where the PHICH is located according to at least one of a timing deviation, an uplink and downlink proportion of the aggregated serving cells and high-layer signaling; and when cross-carrier scheduling is configured, the carrier where the PHICH is located is determined according to the configuration.

In an exemplary embodiment, the step that the terminal transmits the information in the multiple serving cells according to the subframe deviations includes that:

when there are corresponding downlink subframes and uplink subframes under each subframe index, the terminal detects a PHICH in subframe n, and if a PHICH feedback is a Negative Acknowledgement (NACK), sends the retransmitted PUSCH in subframe n+4, herein selection of the serving cell where the retransmitted PUSCH is located includes at least one of that:

when there is no cross-carrier scheduling configured and a carrier corresponding to the PUSCH transmitted in subframe n has an uplink subframe in subframe n+4, the retransmitted PUSCH are transmitted in the same serving cell as that of the PHICH;

when there is no cross-carrier scheduling configured and the carrier corresponding to the PUSCH transmitted in subframe n does not have the uplink subframe in subframe n+4, the retransmitted PUSCH are transmitted in a different serving cell from that of the PHICH, and the terminal determines the serving cell where the retransmitted PUSCH is located according to at least one of a timing deviation, an uplink and downlink proportion of the aggregated serving cells and high-layer signaling; and when cross-carrier scheduling is configured, the carrier where the retransmitted PUSCH is located is determined according to the configuration.

In an exemplary embodiment, the step that the terminal transmits the information in the multiple serving cells according to the subframe deviations includes that:

when there are corresponding uplink subframes under each subframe index, the terminal detects an uplink DCI format or random access response indication with a corresponding Channel State Information (CSI) triggering field set as trigger reporting in subframe n of serving cell c, and sends an aperiodic CSI report on the PUSCH corresponding to subframe n+4.

In an exemplary embodiment, the step that the terminal transmits the information in the multiple serving cells according to the subframe deviations includes that: if there are corresponding uplink subframes under each subframe index:

when a PCell and SCell corresponding to subframe n are both uplink subframes, periodic CSI is sent in the PCell;

when the PCell corresponding to subframe n is an uplink subframe and the SCell is a downlink subframe, the periodic CSI is sent in the PCell; and when the SCell corresponding to subframe n is an uplink subframe and the PCell is a downlink subframe, the periodic CSI is sent in the SCell, herein periodic CSI of each serving cell may be configured according to a period and offset corresponding to an FDD system.

In an exemplary embodiment, the step that the Node B performs information scheduling in the multiple serving cells according to the subframe deviations and transmits the information according to scheduling includes that: the Node B notifies the subframe deviations; and the Node B performs information scheduling on the multiple preset serving cells and performs corresponding information transmission according to scheduling.

In an exemplary embodiment, the step that the Node B notifies the subframe deviations includes that: the Node B notifies the terminal of the subframe deviations, and/or, notifies an adjacent Node B of the subframe deviations.

According to the other aspect of the present disclosure, a Carrier Aggregation device for a communication system is provided, which includes: an aggregation module, arranged to aggregate multiple serving cells with subframe deviations to obtain K PCells and M SCells, herein K and M may be positive integers; and a transmission module, arranged to transmit information in the multiple serving cells according to the subframe deviations.

In an exemplary embodiment, the subframe deviations includes: corresponding subframe index difference values between the serving cells in the same radio frame index, or difference values of subframes where synchronization channels are located between the multiple serving cells.

In an exemplary embodiment, existence of the subframe deviations includes: existence of the subframe deviations between the serving cells with adjacent cell indexes in the multiple serving cells; or existence of the subframe deviations between the multiple serving cells and a fixed serving cell, herein the fixed serving cell may be a serving cell in the multiple serving cells.

In an exemplary embodiment, the fixed serving cell may be one of: a serving cell serving as a PCell, a serving cell with a maximum subframe index and a serving cell predefined by the transmission node.

In an exemplary embodiment, the multiple serving cells includes: Frequency Division Duplex (FDD) serving cells and/or Time Division Duplex (TDD) serving cells.

According to the present disclosure, the multiple serving cells with the subframe deviations are aggregated to obtain the K PCells and the M SCells; and the transmission node transmits the information on the multiple aggregated serving cells according to the subframe deviations, so that a transmission delay may be reduced.

BRIEF DESCRIPTION OF DRAWINGS

The drawings described here are adopted to provide a further understanding to the present disclosure, and form a part of the present disclosure. In the drawings.

SPECIFIC EMBODIMENTS

The present disclosure will be described below with reference to the drawings and embodiments in detail. It is important to note that the embodiments in the present application and characteristics in the embodiments may be freely combined under the condition of no conflicts.

Figure 1:
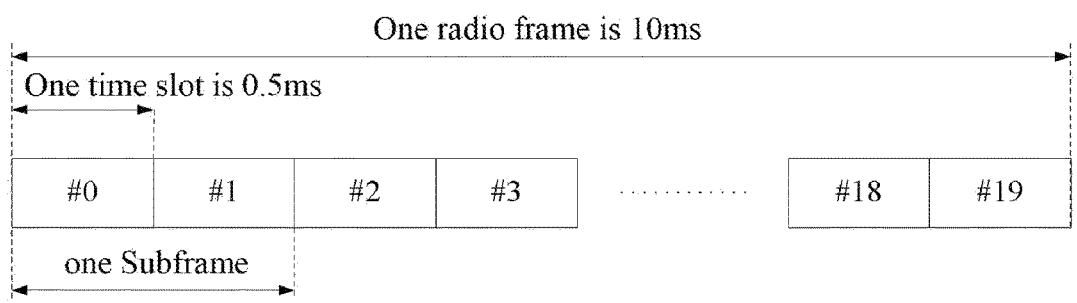
FIG. 1 is a schematic diagram of a frame structure in an LTE FDD system according to the related technology.
Figure 2:
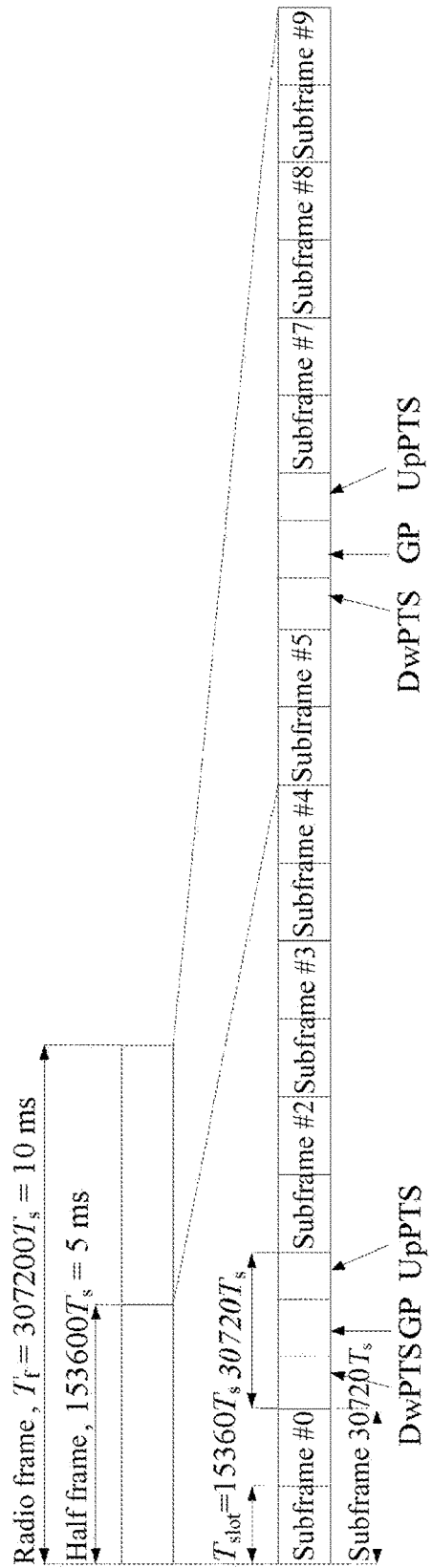
FIG. 2 is a schematic diagram of a frame structure in an LTE TDD system according to the related technology.
Figure 3:
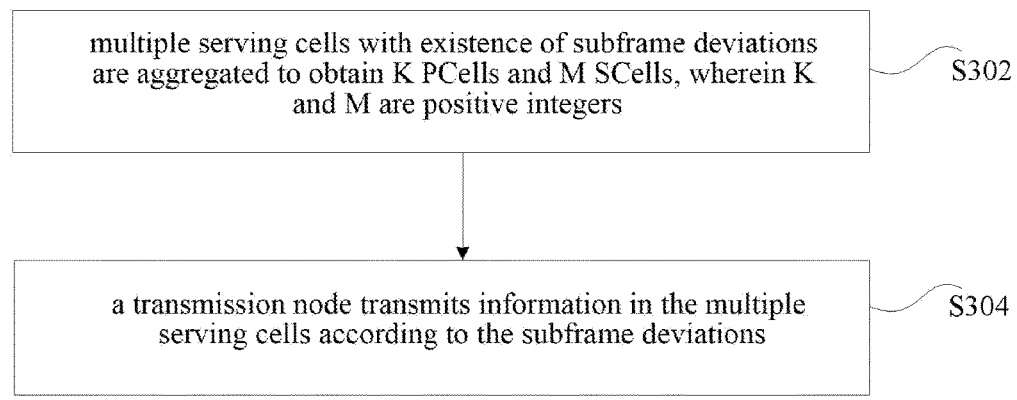
FIG. 3 is a flowchart of a Carrier Aggregation method for a communication system according to an embodiment of the present disclosure.

FIG. 3 is a flowchart of a Carrier Aggregation method for a communication system according to an embodiment of the present disclosure, and as shown in FIG. 3, the method includes Step S302 to Step S304.

In Step S302: multiple serving cells with subframe deviations are aggregated to obtain K PCells and M SCells, herein K and M are positive integers.

In Step S304: a transmission node transmits information in the multiple serving cells according to the subframe deviations.

In an implementation mode of the embodiment of the present disclosure, the subframe deviations are corresponding subframe index difference values between the serving cells in the same radio frame index. In another implementation mode of the embodiment of the present disclosure, the subframe deviations are difference values of subframes where synchronization channels are located between the multiple serving cells.

In an implementation mode of the embodiment of the present disclosure, existence of the subframe deviations includes: existence of the subframe deviations between the serving cells with adjacent cell indexes in the multiple serving cells; or existence of the subframe deviations between the multiple serving cells and a fixed serving cell, herein the fixed serving cell is a serving cell in the multiple serving cells.

In an implementation mode of the embodiment of the present disclosure, the fixed serving cell is one of: a serving cell serving as a PCell, a serving cell with a maximum subframe index and a serving cell predefined by the transmission node.

In an implementation mode of the embodiment of the present disclosure, the multiple serving cells include: Frequency Division Duplex (FDD) serving cells and/or Time Division Duplex (TDD) serving cells.

In an implementation mode of the embodiment of the present disclosure, the transmission node includes a Node B and a terminal; the step that the transmission node transmits the information on multiple preset carriers according to the subframe deviations includes that: the terminal transmits the information in the multiple serving cells according to the subframe deviations; and/or the Node B performs information scheduling in the multiple serving cells according to the subframe deviations, and transmits the information according to scheduling.

In an implementation mode of the embodiment of the present disclosure, before the step that the terminal transmits the information in the multiple serving cells according to the subframe deviations, the method further includes that: the terminal acquires the subframe deviations according to at least one of the following operation that: the terminal acquires the subframe deviations through signaling; the terminal acquires the subframe deviations by detecting locations of the synchronization channels corresponding to the multiple serving cells; and the subframe deviations are acquired by virtue of uplink and downlink configurations corresponding to the multiple serving cells.

In an implementation mode of the embodiment of the present disclosure, when the subframe deviations are acquired by virtue of the uplink and downlink configurations corresponding to the multiple serving cells, the subframe deviations include at least one of that:

when the uplink and downlink configuration of a PCell is #0 and the uplink and downlink configuration of an SCell is #1, the subframe deviation is 3;

when the uplink and downlink configuration of the PCell is #1 and the uplink and downlink configuration of the SCell is #0, the subframe deviation is 2;

when the uplink and downlink configuration of the PCell is #2 and the uplink and downlink configuration of the SCell is #0, the subframe deviation is 2;

when the uplink and downlink configuration of the PCell is #3 and the uplink and downlink configuration of the SCell is #6, the subframe deviation is 3;

when the uplink and downlink configuration of the PCell is #4 and the uplink and downlink configuration of the SCell is #0, the subframe deviation is 2;

when the uplink and downlink configuration of the PCell is #5 and the uplink and downlink configuration of the SCell is #0, the subframe deviation is 2;

when the uplink and downlink configuration of the PCell is #6 and the uplink and downlink configuration of the SCell is #1, the subframe deviation is 3;

when the uplink and downlink configuration of the PCell is #6 and the uplink and downlink configuration of the SCell is #0, the subframe deviation is 2;

when the uplink and downlink configuration of the PCell is one of #0, #3 and #6, the subframe deviation is 3; and when the uplink and downlink configuration of the PCell is one of #1, #2, #4 and #5, the subframe deviation is 2.

Furthermore, in an implementation mode of the embodiment of the present disclosure, the step that the terminal transmits the information in the multiple serving cells according to the subframe deviations includes that: under the condition that there are corresponding uplink subframes under each subframe index, if transmission of a PDSCH corresponding to a PDCCH/EPDCCH or a PDCCH/EPDCCH indicating SPS release or no PDSCH corresponding to the PDCCH/EPDCCH is detected on PCell subframe n, or transmission of the PDSCH corresponding to the PDCCH/EPDCCH is detected on SCell subframe n, the terminal sends a corresponding HARQ-ACK on uplink subframe n+4, herein when a PCell and SCell corresponding to subframe n+4 are both uplink subframes, the terminal sends the HARQ-ACK in the PCell;

when the PCell corresponding to subframe n+4 is an uplink subframe and the SCell is a downlink subframe, the terminal sends the HARQ-ACK in the PCell; and when the SCell corresponding to subframe n+4 is an uplink subframe and the PCell is a downlink subframe, the HARQ-ACK is sent in the SCell.

In an implementation mode of the embodiment of the present disclosure, the step that the terminal transmits the information in the multiple serving cells according to the subframe deviations includes that: when there are corresponding downlink subframes and uplink subframes under each subframe index, if DCI corresponding to transmission of a PUSCH is detected in subframe n, the terminal transmits the PUSCH in subframe n+4, herein selection of the serving cell where the DCI is located includes at least one of that:

when there is no cross-carrier scheduling configured and a carrier corresponding to the PUSCH transmitted in subframe n+4 has a downlink subframe in subframe n, the DCI and the PUSCH are transmitted in the same serving cell;

when there is no cross-carrier scheduling configured and the carrier corresponding to the PUSCH transmitted in subframe n+4 does not have the downlink subframe in subframe n, the DCI and the PUSCH are transmitted in different serving cells, and the terminal determines the serving cell where the DCI is located according to at least one of a timing deviation, an uplink and downlink proportion of the aggregated serving cells and high-layer signaling; and when cross-carrier scheduling is configured, the carrier where the DCI corresponding to the PUSCH is located is determined according to the configuration.

In an implementation mode of the embodiment of the present disclosure, the step that the terminal transmits the information in the multiple serving cells according to the subframe deviations includes that: when there are corresponding downlink subframes and uplink subframes under each subframe index, the terminal sends a PUSCH in subframe n, and detects a PHICH corresponding to the PUSCH in subframe n+4, herein selection of the serving cell where the PHICH is located includes at least one of that:

when there is no cross-carrier scheduling configured and a carrier corresponding to the PUSCH transmitted in subframe n has a downlink subframe in subframe n+4, the PHICH and the PUSCH are transmitted in the same serving cell;

when there is no cross-carrier scheduling configured and the carrier corresponding to the PUSCH transmitted in subframe n+4 does not have the downlink subframe in subframe n, the PHICH and the PUSCH are transmitted in different serving cells, and the terminal determines the serving cell where the PHICH is located according to at least one of a timing deviation, an uplink and downlink proportion of the aggregated serving cells and high-layer signaling; and when cross-carrier scheduling is configured, the carrier where the PHICH is located is determined according to the configuration.

In an implementation mode of the embodiment of the present disclosure, the step that the terminal transmits the information in the multiple serving cells according to the subframe deviations includes that: when there are corresponding downlink subframes and uplink subframes under each subframe index, the terminal detects a PHICH in subframe n, and if a PHICH feedback is a NACK, sends the retransmitted PUSCH in subframe n+4, herein selection of the serving cell where the retransmitted PUSCH is located includes at least one of that:

when there is no cross-carrier scheduling configured and a carrier corresponding to the PHICH transmitted in subframe n has an uplink subframe in subframe n+4, the retransmitted PUSCH and the PHICH are transmitted in the same serving cell;

when there is no cross-carrier scheduling configured and the carrier corresponding to the PHICH transmitted in subframe n does not have the uplink subframe in subframe n+4, the retransmitted PUSCH and the PHICH are transmitted in different serving cells, and the terminal determines the serving cell where the retransmitted PUSCH is located according to at least one of a timing deviation, an uplink and downlink proportion of the aggregated serving cells and high-layer signaling; and when cross-carrier scheduling is configured, the carrier where the retransmitted PUSCH is located is determined according to the configuration.

In an implementation mode of the embodiment of the present disclosure, the step that the terminal transmits the information in the multiple serving cells according to the subframe deviations includes that: when there are corresponding uplink subframes under each subframe index, the terminal detects an uplink DCI format or random access response indication with a corresponding CSI triggering field set as trigger reporting in subframe n of serving cell c, and sends an aperiodic CSI report on the PUSCH corresponding to subframe n+4.

In an implementation mode of the embodiment of the present disclosure, the step that the terminal transmits the information in the multiple serving cells according to the subframe deviations includes that: if there are corresponding uplink subframes under each subframe index:

when a PCell and SCell corresponding to subframe n are both uplink subframes, periodic CSI is sent in the PCell;

when the PCell corresponding to subframe n is an uplink subframe and the SCell is a downlink subframe, the periodic CSI is sent in the PCell; and when the SCell corresponding to subframe n is an uplink subframe and the PCell is a downlink subframe, the periodic CSI is sent in the SCell, herein periodic CSI of each serving cell is configured according to a period and offset corresponding to an FDD system.

In an implementation mode of the embodiment of the present disclosure, the step that the Node B performs information scheduling in the multiple serving cells according to the subframe deviations and transmits the information according to scheduling includes that: the Node B notifies the subframe deviations; and the Node B performs information scheduling on the multiple preset carriers and performs corresponding information transmission according to scheduling.

In an implementation mode of the embodiment of the present disclosure, the step that the Node B notifies the subframe deviations includes that: the Node B notifies the terminal of the subframe deviations, and/or, notifies an adjacent Node B of the subframe deviations.

Figure 4:
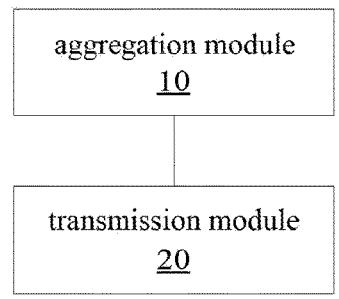
FIG. 4 is a structure block diagram of a Carrier Aggregation device for a communication system according to an embodiment of the present disclosure.

FIG. 4 is a structure block diagram of a Carrier Aggregation device for a communication system according to an embodiment of the present disclosure, and as shown in FIG. 4, the device includes: an aggregation module 10, arranged to aggregate multiple serving cells with subframe deviations to obtain K PCells and M SCells, herein K and M are positive integers; and a transmission module 20, arranged to transmit information in the multiple serving cells according to the subframe deviations.

In an implementation mode of the embodiment of the present disclosure, the subframe deviations are corresponding subframe index difference values between the serving cells in the same radio frame index.

In an implementation mode of the embodiment of the present disclosure, the subframe deviations are difference values of subframes where synchronization channels are located between the multiple serving cells.

In an implementation mode of the embodiment of the present disclosure, existence of the subframe deviations includes: existence of the subframe deviations between the serving cells with adjacent cell indexes in the multiple serving cells; or existence of the subframe deviations between the multiple serving cells and a fixed serving cell, herein the fixed serving cell is a serving cell in the multiple serving cells.

In an implementation mode of the embodiment of the present disclosure, the fixed serving cell is one of: a serving cell serving as a PCell, a serving cell with a maximum subframe index and a serving cell predefined by the transmission node.

In an implementation mode of the embodiment of the present disclosure, the multiple serving cells include: Frequency Division Duplex (FDD) serving cells and/or Time Division Duplex (TDD) serving cells.

Parts the same as those in the abovementioned method refer to the above descriptions of the present disclosure, and will not be elaborated herein.

Specific examples of the embodiments of the present disclosure will be described below.

Embodiment 1

Example 1

Figure 5:
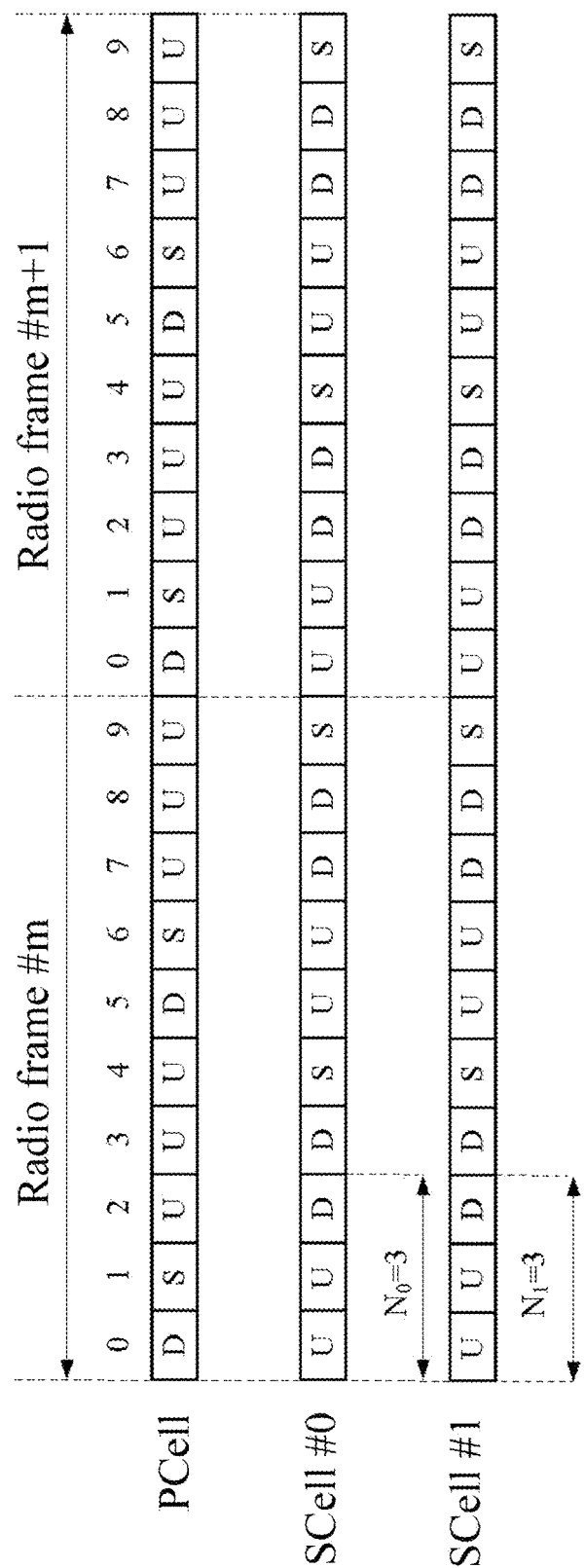
FIG. 5 is a schematic diagram of example 1 of embodiment 1 of the present disclosure.

In the example, a PCell is a TDD serving cell with uplink and downlink configuration #0, SCell #0 is a TDD serving cell with uplink and downlink configuration #1, and SCell #1 is a TDD serving cell with uplink and downlink configuration #1; and as an example of the embodiment of the present disclosure, a Carrier Aggregation method is that: if the PCell is a fixed serving cell, SCell #0, SCell#1 and the PCell are aggregated with subframe deviations N0 and N1, as shown in FIG. 5, herein the uplink and downlink configuration of the PCell is #0, and the uplink and downlink configurations of both SCell#0 and SCell#1 are #1, so that values of both N0 and N1 are 3, or, the uplink and downlink configuration of the PCell is #0, so that the values of both N0 and N1 are 3, or, a Node B and a terminal predetermine that the values of both N0 and N1 are 3.

Example 3

Figure 6:
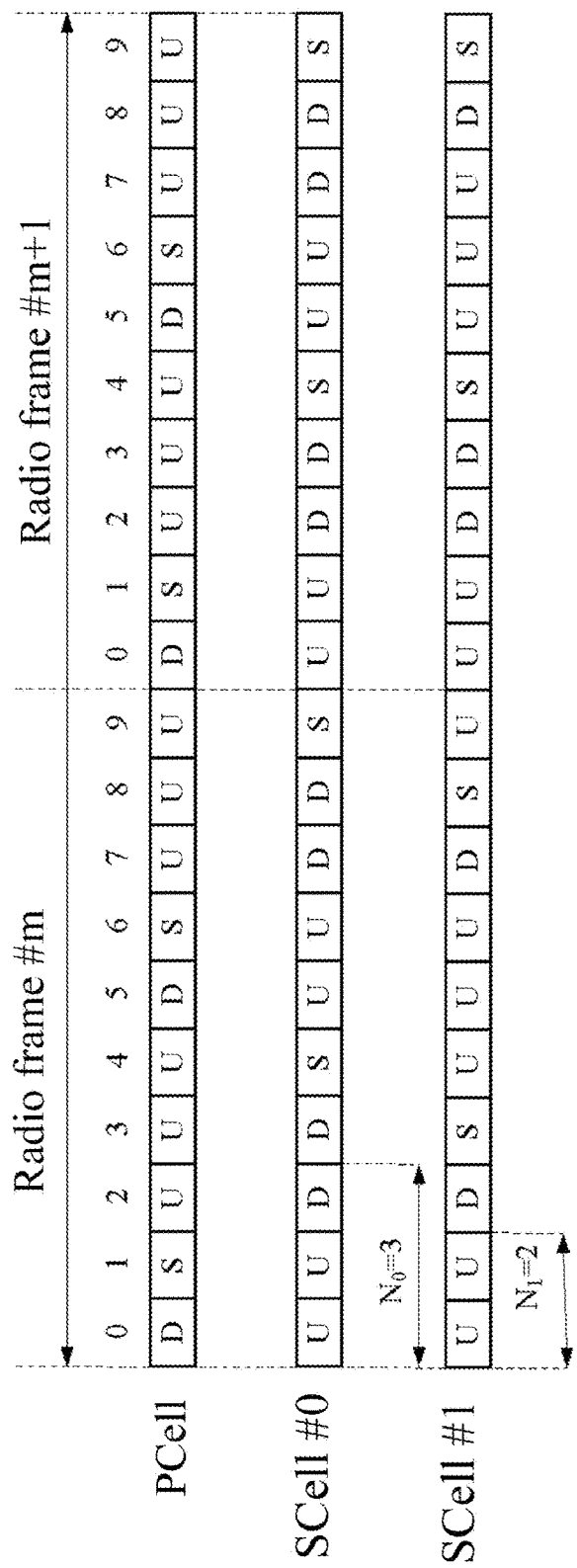
FIG. 6 is a schematic diagram of example 2 of embodiment 1 of the present disclosure.

In the example, as shown in FIG. 6: a PCell is a TDD serving cell with uplink and downlink configuration #0, SCell #0 is a TDD serving cell with uplink and downlink configuration #1 and SCell #1 is a TDD serving cell with uplink and downlink configuration #0; and as an example of the embodiment of the present disclosure, a Carrier Aggregation method is that: if the PCell is a fixed serving cell, SCell #0, SCell#1 and the PCell are aggregated with subframe deviations N0 and N1, as shown in FIG. 6, herein the uplink and downlink configuration of the PCell is #0, and the uplink and downlink configuration of SCell#0 is #1, so that a value of N0 is 3, and the uplink and downlink configuration of the PCell is #0 and the uplink and downlink configurations of SCell #1 is #0, so that a value of N1 is 2.

Example 3

In the example, a PCell is an FDD serving cell and SCell #0 is an FDD serving cell.

Figure 7:
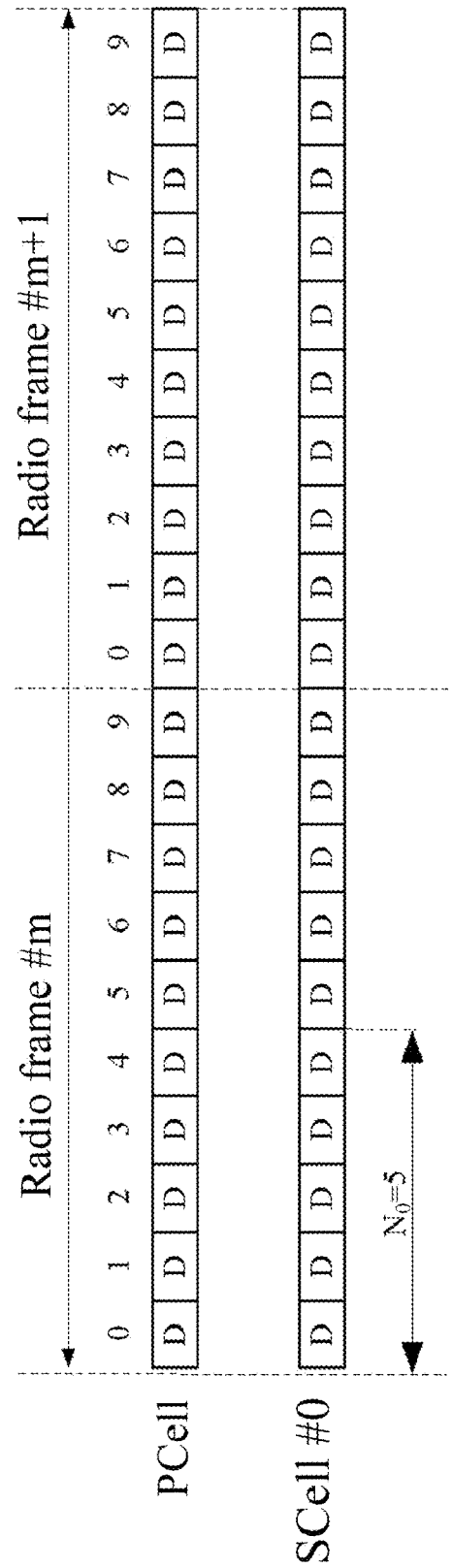
FIG. 7 is a schematic diagram of example 3 of embodiment 1 of the present disclosure.

As an example of the embodiment of the present disclosure, a Carrier Aggregation method is that: a terminal and a Node B predetermine that the PCell is a fixed serving cell, and SCell #0 and the PCell are aggregated with subframe deviation N0, herein the Node B and the terminal predetermine that a value of N0 is 5, and FIG. 7 shows an FDD downlink. From the figure, it can be seen that public information of the aggregated serving cells is sent on different subframes, so that intercell public information interference may be reduced.

Example 4

Figure 8:
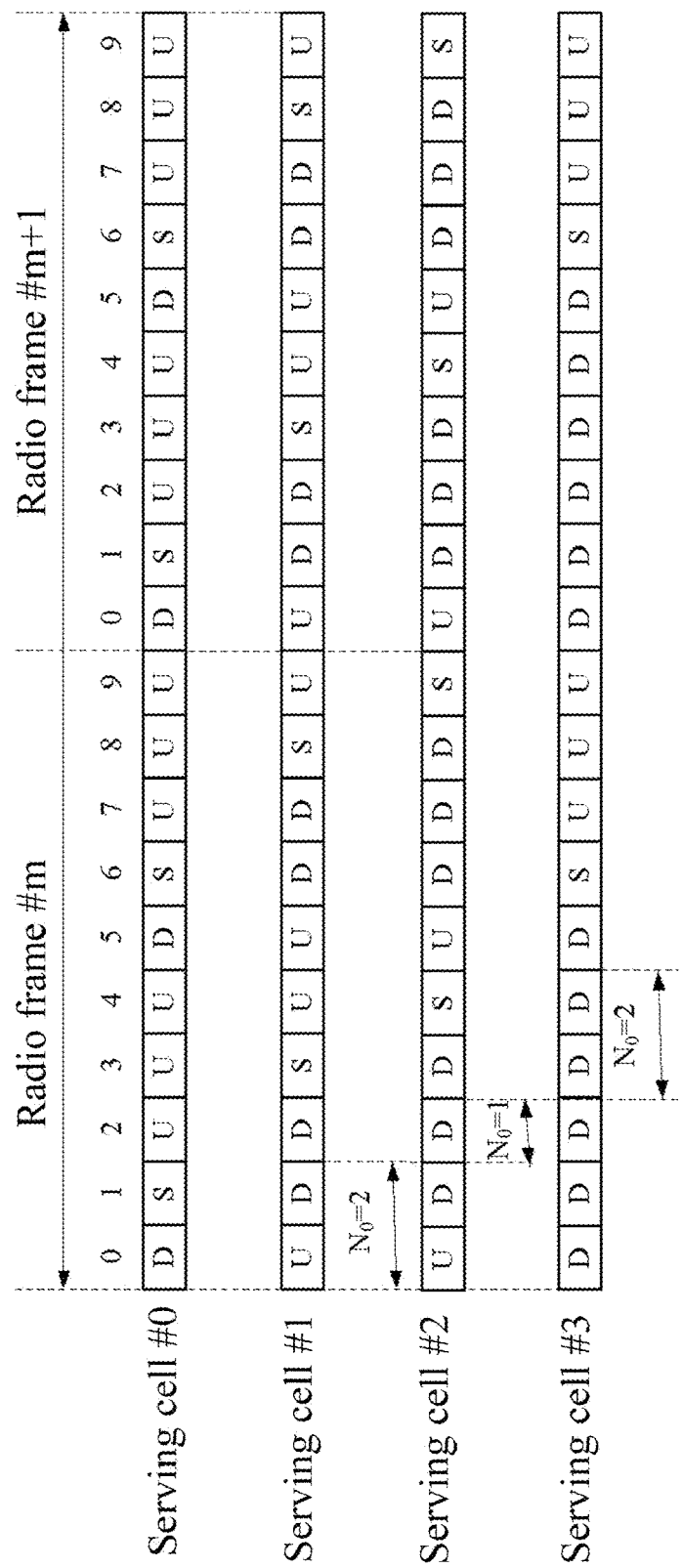
FIG. 8 is a schematic diagram of example 4 of embodiment 1 of the present disclosure.

In the example, serving cell #0 is a TDD serving cell with uplink and downlink configuration 0, serving cell #1 is a TDD serving cell with uplink and downlink configuration #1, serving cell #2 is a TDD serving cell with uplink and downlink configuration 2, and serving cell #3 is a TDD serving cell with uplink and downlink configuration #3; and as an example of the embodiment of the present disclosure, a Carrier Aggregation method is that: there exist subframe deviations between the serving cells with adjacent cell indexes, that is, subframe deviation N0 exists between serving cell #0 and serving cell #1, serving cell #1 and serving cell #2 are aggregated with subframe deviation N1, subframe deviation N2 exists between serving cell #2 and serving cell #3, and it is supposed that values of N0 and N2 are both 2 and a value of N1 is 1, as shown in FIG. 8.

Embodiment 2

Example 1

Figure 9:
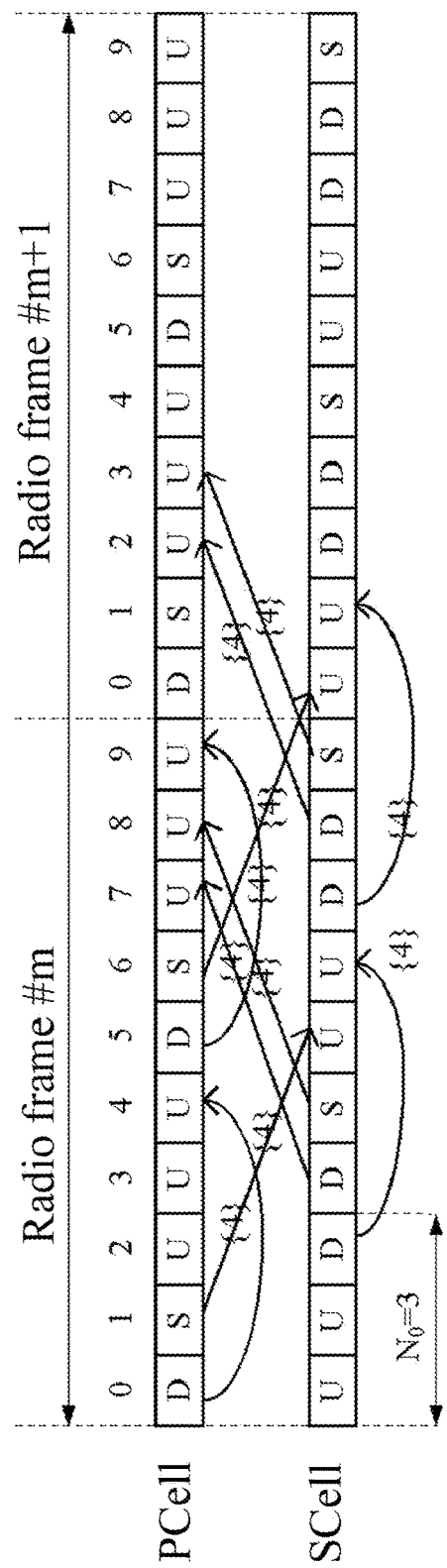
FIG. 9 is a schematic diagram of example 1 of embodiment 2 of the present disclosure.

In the example, as shown in FIG. 9, an uplink and downlink configuration of a PCell is #0, an uplink and downlink configuration of an SCell is #1, and the PCell and the SCell are aggregated according to a Carrier Aggregation method provided by the present disclosure.

A terminal obtains subframe deviation N0=3 between the PCell and the SCell through high-layer signaling, herein the high-layer signaling may be Radio Resource Control (RRC) signaling where the subframe deviation is represented to be 1, 2, 3 or 4 by 2 bits, and may also be Media Access Control (MAC)-layer signaling.

The terminal detects transmission of a PDSCH in the PCell in subframe #0 of radio frame #m, and because the PCell corresponds to subframe #4 of radio frame #m, a HARQ-ACK response corresponding to the PDSCH in subframe #0 of the PCell is sent in subframe #4 of radio frame #m of the PCell, that is, k=4; the terminal detects transmission of a PDSCH in the PCell in subframe #1 of radio frame #m, and because subframe #5, corresponding to the SCell, of radio frame #m is an uplink subframe, a HARQ-ACK response corresponding to the PDSCH in subframe #1 of the PCell is sent in the SCell in subframe #5 of radio frame #m, that is, k=4; the terminal detects transmission of a PDSCH in the PCell in subframe #5 of radio frame #m, and because the PCell corresponds to subframe #9 of radio frame #m, a HARQ-ACK response corresponding to the PDSCH in subframe #5 of the PCell is sent in subframe #9 of radio frame #m of the PCell, that is, k=4; and the terminal detects transmission of a PDSCH in the PCell in subframe #6 of radio frame #m, and because subframe #0, corresponding to the SCell, of radio frame #m+1 is an uplink subframe, a HARQ-ACK response corresponding to the PDSCH in subframe #6 of the PCell is sent in subframe #0 of radio frame #m+1 of the SCell, that is, k=4.

The terminal detects transmission of a PDSCH in the SCell in subframe #2 of radio frame #m, and because subframe #6, corresponding to the SCell, of radio frame #m is an uplink subframe, a HARQ-ACK response corresponding to the PDSCH in subframe #2 of the SCell is sent in subframe #6 of radio frame #m of the SCell, that is, k=4; the terminal detects transmission of a PDSCH in the SCell in subframe #3 of radio frame #m, and because subframe #7, corresponding to the PCell, of radio frame #m is an uplink subframe, a HARQ-ACK response corresponding to the PDSCH in subframe #3 of the SCell is sent in subframe #7 of radio frame #m, that is, k=4; the terminal detects transmission of a PDSCH in the SCell in subframe #4 of radio frame #m, and because subframe #8, corresponding to the PCell, of radio frame #m is an uplink subframe, a HARQ-ACK response corresponding to the PDSCH in subframe #4 of the SCell is sent in subframe #8 of radio frame #m of the PCell, that is, k=4; the terminal detects transmission of a PDSCH in the SCell in subframe #7 of radio frame #m, and because subframe #0, corresponding to the SCell, of radio frame #m+1 is an uplink subframe, a HARQ-ACK response corresponding to the PDSCH in subframe #7 of the SCell is sent in subframe #0 of radio frame #m+1 of the SCell, that is, k=4; the terminal detects transmission of a PDSCH in the SCell in subframe #8 of radio frame #m, and because subframe #1, corresponding to the PCell, of radio frame #m+1 is an uplink subframe, a HARQ-ACK response corresponding to the PDSCH in subframe #8 of the SCell is sent in subframe #1 of radio frame #m+1 of the PCell, that is, k=4; and the terminal detects transmission of a PDSCH in the SCell in subframe #9 of radio frame #m, and because subframe #2, corresponding to the PCell, of radio frame #m+1 is an uplink subframe, a HARQ-ACK response corresponding to the PDSCH in subframe #9 of the SCell is sent in subframe #2 of radio frame #m+1 of the PCell, that is, k=4.

When there is no cross-carrier scheduling configured, the terminal detects DCI corresponding to transmission of a PUSCH on downlink subframe #0 of radio frame #m of the PCell, and transmits the corresponding PUSCH in subframe 4 of the PCell, and if a CSI triggering field in the DCI is set as trigger reporting, corresponding CSI is sent in subframe 4 of the PCell; and the terminal detects a PHICH corresponding to the PUSCH in subframe #8 of radio frame #m of the SCell, and if the PHICH is a NACK, the terminal sends the retransmitted PUSCH in subframe #2 of radio frame #m+1 of the PCell. When there is no cross-carrier scheduling configured, the terminal detects DCI corresponding to transmission of a PUSCH on downlink subframe #1 of radio frame #m of the PCell, and transmits the corresponding PUSCH in subframe #5 of radio frame #m of the SCell, and if a CSI triggering field in the DCI is set as trigger reporting, corresponding CSI is sent in subframe #5 of radio frame #m of the SCell; and the terminal detects a PHICH corresponding to the PUSCH in subframe #9 of radio frame #m of the SCell, and if the PHICH is a NACK, the terminal sends the retransmitted PUSCH in subframe #3 of radio frame #m+1 of the PCell.

From the embodiment, it can be seen that existence of corresponding uplink subframes and downlink subframes in each radio frame may be implemented by the carrier aggregation manner provided by the present disclosure, namely by configuring the subframe deviations to the aggregated serving cells, so that feedback delays corresponding to the HARQ-ACK responses are all 4, scheduling time between the PDCCH and the PUSCH is 4, time between the PUSCH and the corresponding PHICH feedback is 4, time between the PHICH and the retransmitted PUSCH is 4, and a minimum value of a feedback delay of an existing TDD system is ensured.

Example 2

Figure 10:
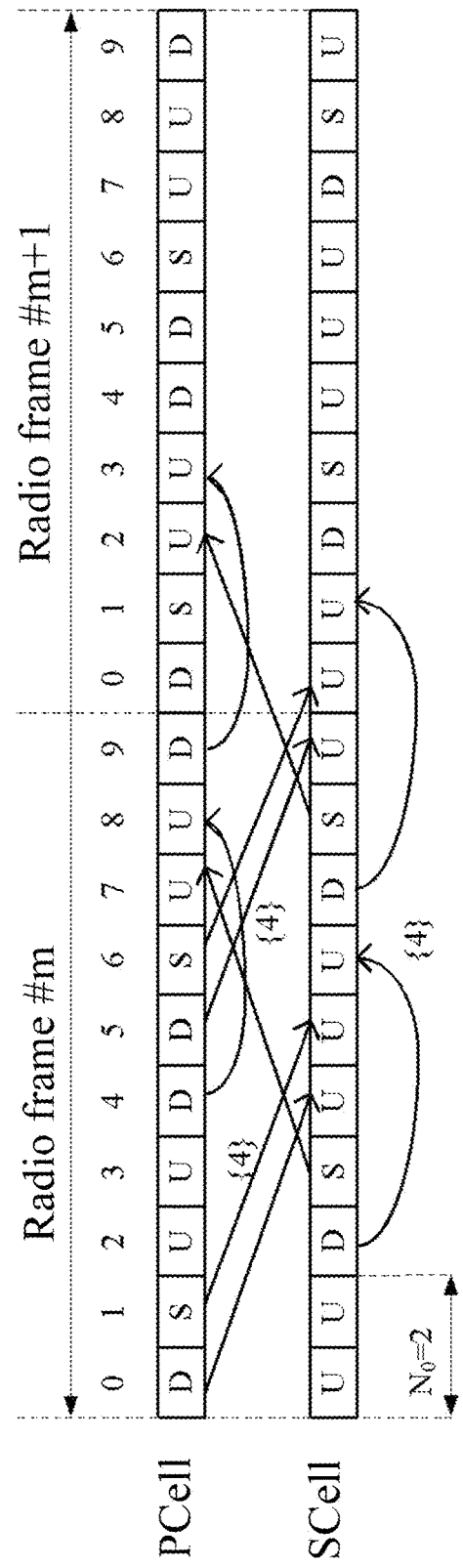
FIG. 10 is a schematic diagram of example 2 of embodiment 2 of the present disclosure.

In the example, as shown in FIG. 10, an uplink and downlink configuration of a PCell is #1, an uplink and downlink configuration of an SCell is #0, and the PCell and the SCell are aggregated according to a Carrier Aggregation method provided by the present disclosure.

A terminal detects a position of a synchronization channel of the SCell, and determines that subframe #2 is a first subframe corresponding to the SCell, that is, subframe deviation N0=2; and processes of information sending and receiving of the terminal in the PCell and the SCell are similar to example 1, and will not be elaborated herein.

Example 3

Figure 11:
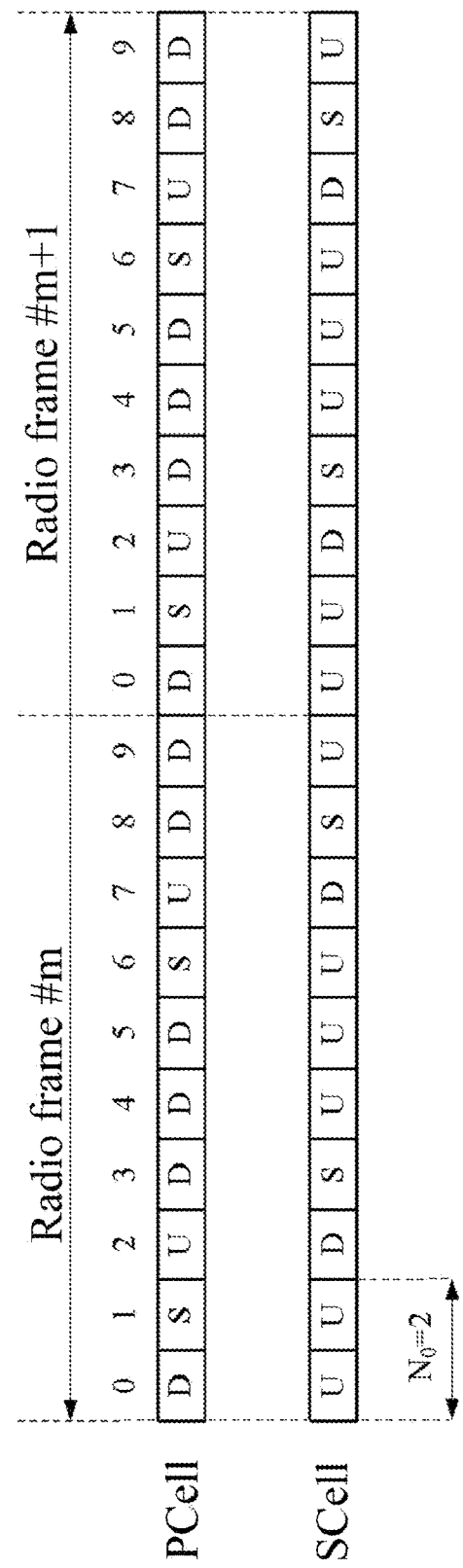
FIG. 11 is a schematic diagram of example 3 of embodiment 2 of the present disclosure.

In the example, as shown in FIG. 11, an uplink and downlink configuration of a PCell is #2, an uplink and downlink configuration of an SCell is #0, and the PCell and the SCell are aggregated according to a Carrier Aggregation method provided by the present disclosure.

A terminal obtains subframe deviation N0=2 between the PCell and the SCell through physical-layer signaling, herein the physical-layer signaling may represent 1~4 subframe deviations by virtue of idle bits in DCI or adding 2 bits in the DCI, and the like.

The terminal detects transmission of a PDSCH in the PCell in subframe #0 of radio frame #m, and because subframe #8, corresponding to both the PCell and the SCell, of radio frame #m is a downlink subframe, HARQ-ACKs corresponding to the PDSCH in the PCell and the SCell are both sent in the PCell, and at this moment, a value of k is determined by a conventional art. For example, the SCell may be considered as an FDD serving cell, herein an uplink subframe corresponding to the SCell is equivalent to a subframe which is not scheduled in the FDD serving cell, and the value of k may be determined according to a value specified in TDD-FDD aggregation.

Embodiment 3

Example 1

In the example, as shown in FIG. 9, an uplink and downlink configuration of a PCell is #0, an uplink and downlink configuration of an SCell is #1, and the PCell and the SCell are aggregated according to a Carrier Aggregation method provided by the present disclosure.

Because the uplink and downlink configuration of the PCell is #0 and the uplink and downlink configuration of the SCell is #1, a terminal determines that subframe deviation N0 is 3 in a table query or predefined manner, and the terminal sends and receives data in the PCell and the SCell. Processes of receiving downlink data and sending corresponding HARQ-ACK response information by the terminal are the same as those in example 1 of embodiment 2, and will not be elaborated herein.

Example 2

In the example, as shown in FIG. 10, an uplink and downlink configuration of a PCell is #1, an uplink and downlink configuration of an SCell is #0, and the PCell and the SCell are aggregated according to a Carrier Aggregation method provided by the present disclosure.

Because the uplink and downlink configuration of the PCell is #1 and the uplink and downlink configuration of the SCell is #0, a terminal determines that subframe deviation N0 is 2 in a table query or predefined manner, and the terminal sends and receives data in the PCell and the SCell. Processes of receiving downlink data and sending corresponding HARQ-ACK response information by the terminal are the same as those in example 2 of embodiment 2, and will not be elaborated herein.

Example 3

In the example, as shown in FIG. 11, an uplink and downlink configuration of a PCell is #2, an uplink and downlink configuration of an SCell is #0, and the PCell and the SCell are aggregated according to a Carrier Aggregation method provided by the present disclosure.

Because the uplink and downlink configuration of the PCell is #2 and the uplink and downlink configuration of the SCell is #0, a terminal determines that subframe deviation N0 is 2 in a table query or predefined manner, and the terminal sends and receives data in the PCell and the SCell. Processes of receiving downlink data and sending corresponding HARQ-ACK response information by the terminal are the same as those in example 3 of embodiment 2, and will not be elaborated herein.

Example 4

Figure 12:
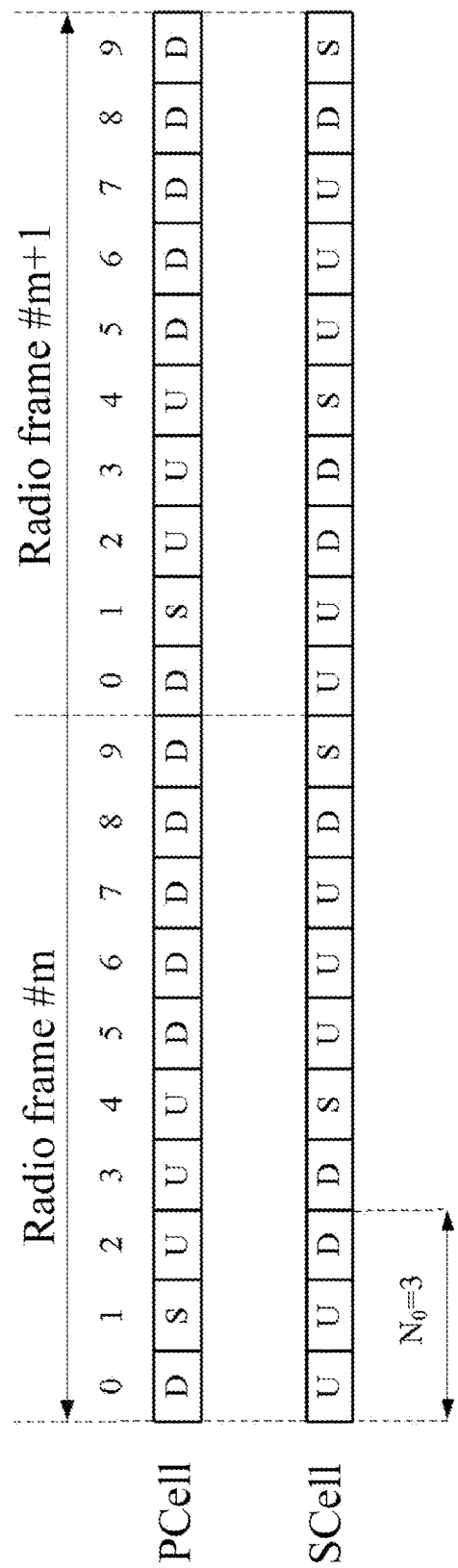
FIG. 12 is a schematic diagram of example 5 of embodiment 3 of the present disclosure.

In the example, as shown in FIG. 12, an uplink and downlink configuration of a PCell is #3, an uplink and downlink configuration of an SCell is #6, and the PCell and the SCell are aggregated according to a Carrier Aggregation method provided by the present disclosure.

Because the uplink and downlink configuration of the PCell is #3 and the uplink and downlink configuration of the SCell is #6, a terminal determines that subframe deviation N0 is 3 in a table query or predefined manner.

Because subframes #8 and #9, corresponding to the PCell and the SCell, of radio frame #m are both downlink subframes, HARQ-ACKs corresponding to a PDSCH in the PCell and the SCell are both sent in the PCell, and at this moment, a value of k may be determined according to the related technology, which will not be elaborated herein.

Example 5

Figure 13:
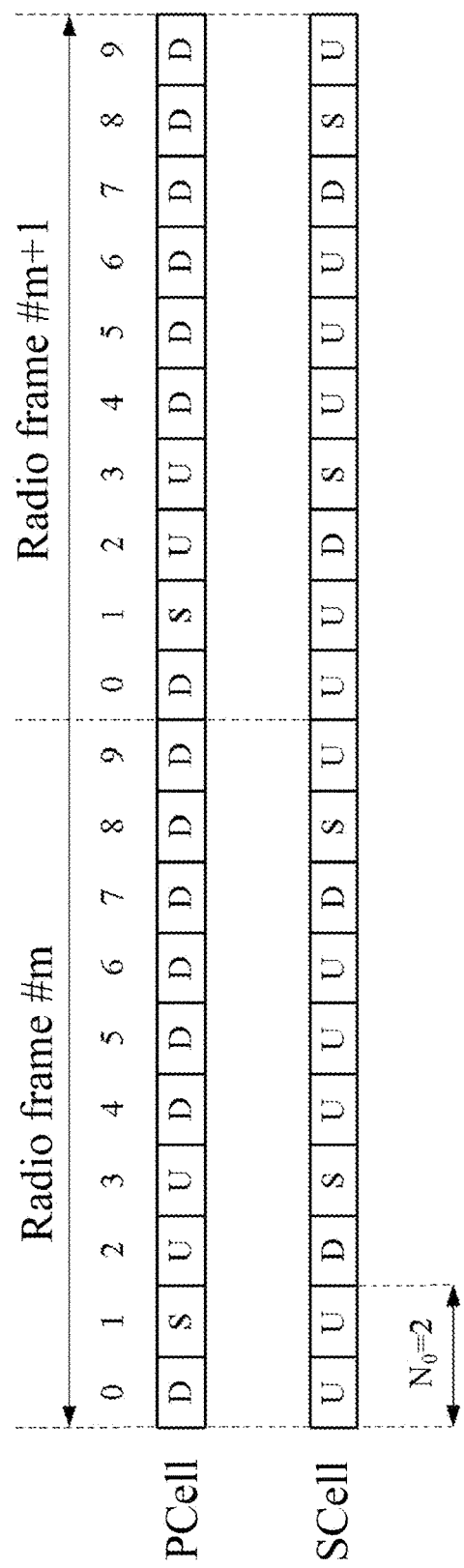
FIG. 13 is a schematic diagram of example 6 of embodiment 3 of the present disclosure.

In the example, as shown in FIG. 13, an uplink and downlink configuration of a PCell is #4, an uplink and downlink configuration of an SCell is #0, and the PCell and the SCell are aggregated according to a Carrier Aggregation method provided by the present disclosure.

Because the uplink and downlink configuration of the PCell is #4 and the uplink and downlink configuration of the SCell is #0, a terminal determines that subframe deviation N0 is 2 in a table query or predefined manner; and The terminal detects transmission of a PDSCH in the SCell in subframe #3 of radio frame #m, and because subframes #7 and #8, corresponding to the PCell and the SCell, of radio frame #m are both downlink subframes, HARQ-ACKs corresponding to the PDSCH in the PCell and the SCell are both sent in the PCell, and at this moment, a value of k may be determined according to the related technology, which will not be elaborated herein.

Example 6

Figure 14:
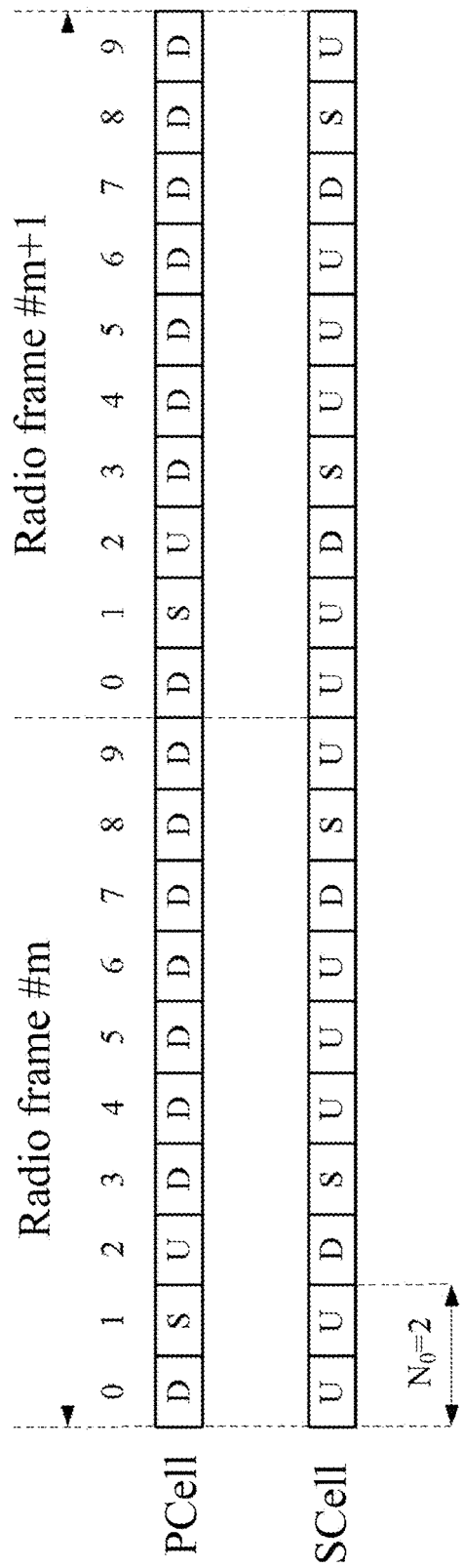
FIG. 14 is a schematic diagram of example 7 of embodiment 3 of the present disclosure.

In the example, as shown in FIG. 14, an uplink and downlink configuration of a PCell is #5, an uplink and downlink configuration of an SCell is #0, and the PCell and the SCell are aggregated according to a Carrier Aggregation method provided by the present disclosure.

Because the uplink and downlink configuration of the PCell is #5 and the uplink and downlink configuration of the SCell is #0, a terminal determines that subframe deviation N0 is 2 in a table query or predefined manner; and The terminal detects transmission of a PDSCH in the PCell and the SCell in subframe #3 of radio frame #m, and because subframes #7 and #8, corresponding to the PCell and the SCell, of radio frame #m are both downlink subframes, HARQ-ACKs corresponding to the PDSCH in the PCell and the SCell are both sent in the PCell, and at this moment, a value of k may be determined according to the related technology, which will not be elaborated herein.

Example 7

Figure 15:
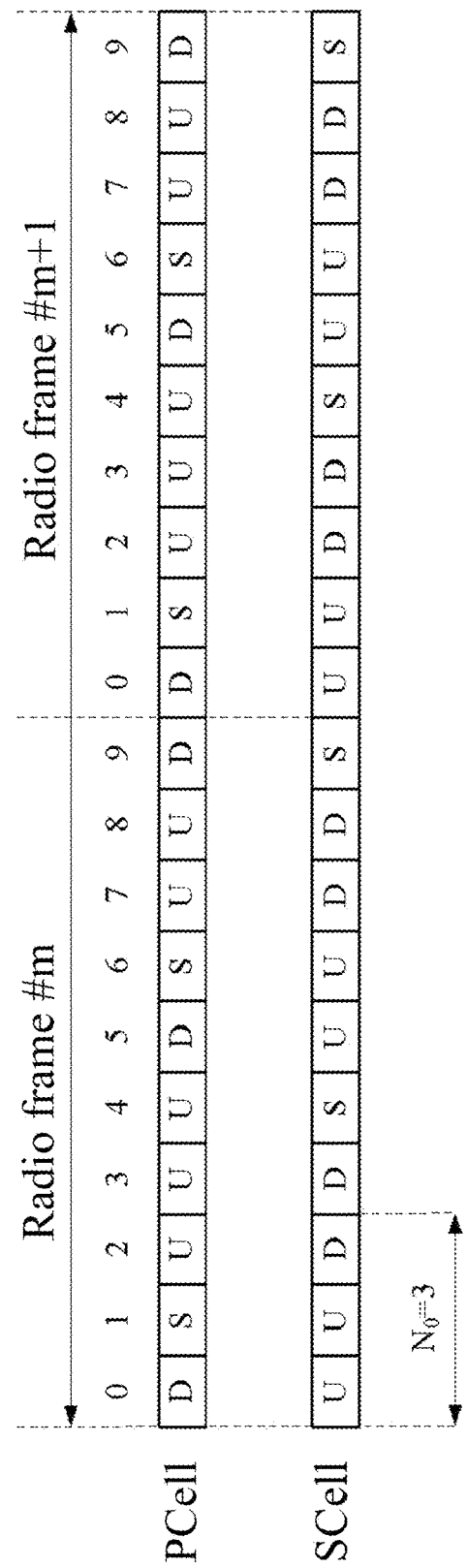
FIG. 15 is a schematic diagram of example 7 of embodiment 3 of the present disclosure.

In the example, as shown in FIG. 15, an uplink and downlink configuration of a PCell is #6, an uplink and downlink configuration of an SCell is #0, and the PCell and the SCell are aggregated according to a Carrier Aggregation method provided by the present disclosure.

Because the uplink and downlink configuration of the PCell is #6 and the uplink and downlink configuration of the SCell is #0, a terminal determines that subframe deviation N0 is 3 in a table query or predefined manner; and The terminal detects transmission of a PDSCH in the PCell in subframe #5 of radio frame #m, and because subframe #9, corresponding to both the PCell and the SCell, of radio frame #m is a downlink subframe, HARQ-ACKs corresponding to the PDSCH in the PCell and the SCell are both sent in the PCell, and at this moment, a value of k may be determined according to the related technology, which will not be elaborated herein.

Example 8

Figure 16:
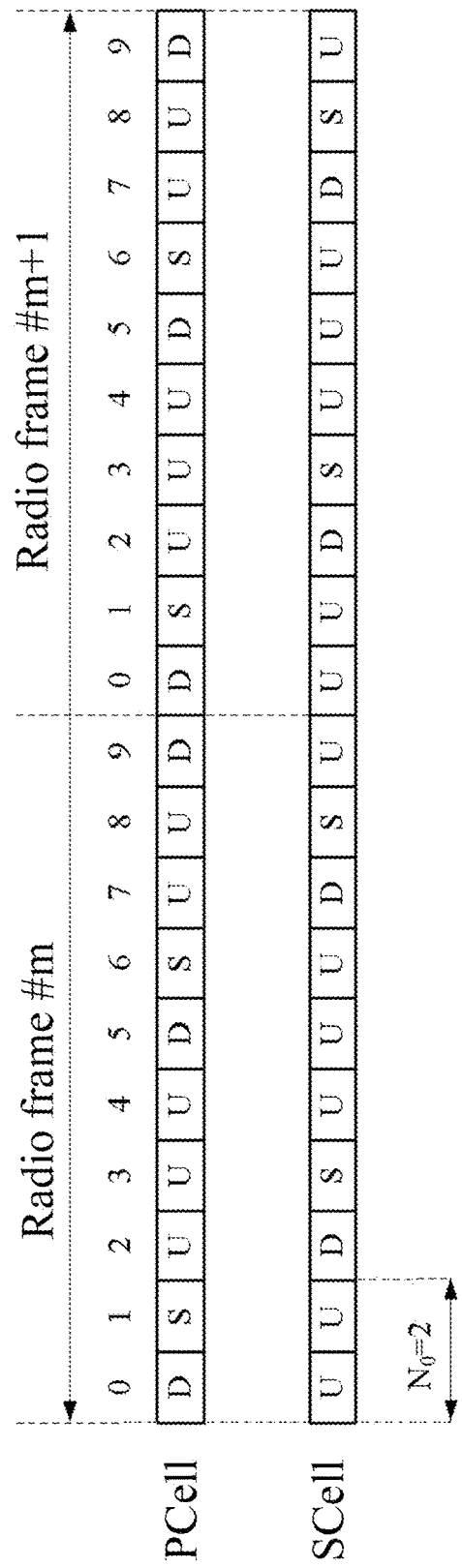
FIG. 16 is a schematic diagram of example 8 of embodiment 3 of the present disclosure.

In the example, as shown in FIG. 16, an uplink and downlink configuration of a PCell is #6, an uplink and downlink configuration of an SCell is #1, and the PCell and the SCell are aggregated according to a Carrier Aggregation method provided by the present disclosure.

Because the uplink and downlink configuration of the PCell is #6 and the uplink and downlink configuration of the SCell is #1, a terminal determines that subframe deviation N0 is 2 in a table query or predefined manner.

Information sending and receiving processes of the terminal are similar to those in example 1, and will not be elaborated herein.

Herein, the table query or predetermined manner adopted by the terminal belongs to an implementation manner for the terminal to obtain the subframe deviation through the uplink and downlink configurations corresponding to the PCell and the SCell, and of course, another implementation manner for obtaining the subframe deviation according to the uplink and downlink configurations corresponding to the PCell and the SCell may also be adopted.

Embodiment 4

Example 1

Figure 17:
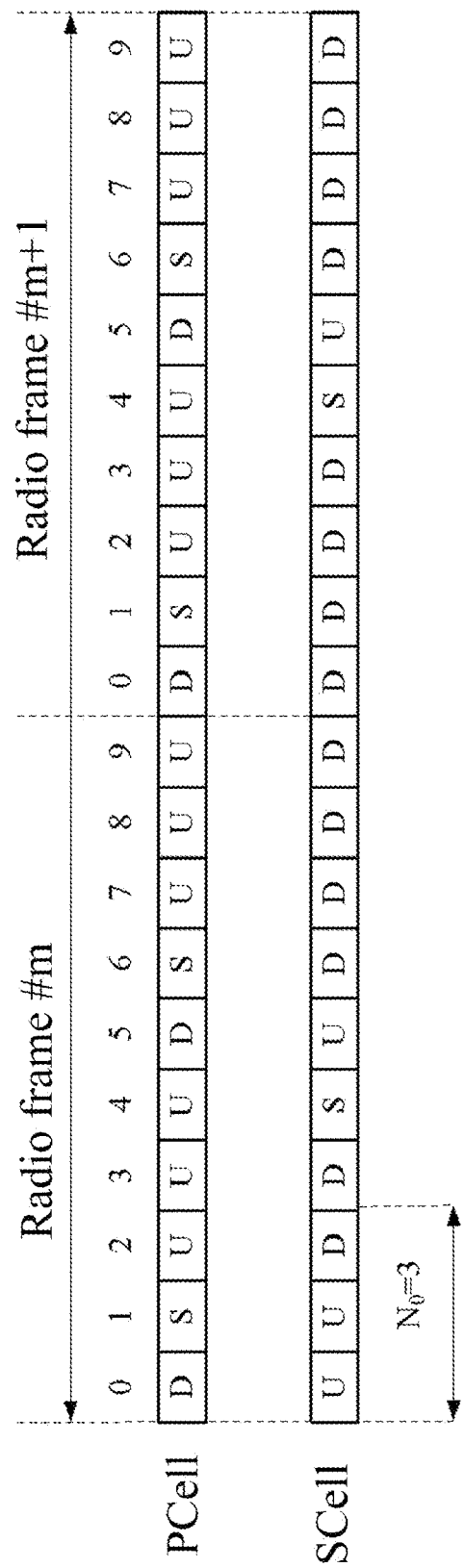
FIG. 17 is a schematic diagram of example 1 of embodiment 4 of the present disclosure.

In the example, as shown in FIG. 17, an uplink and downlink configuration of a PCell is #0, an uplink and downlink configuration of an SCell is #5, and the PCell and the SCell are aggregated according to a Carrier Aggregation method provided by the present disclosure. A terminal determines that subframe deviation N0 is 3 according to the uplink and downlink configuration of the PCell, and the terminal sends and receives information in the PCell and the SCell. Information sending and receiving processes of the terminal have been described in embodiment 2 and embodiment 3 in detail, and will not be elaborated herein.

Example 2

Figure 18:
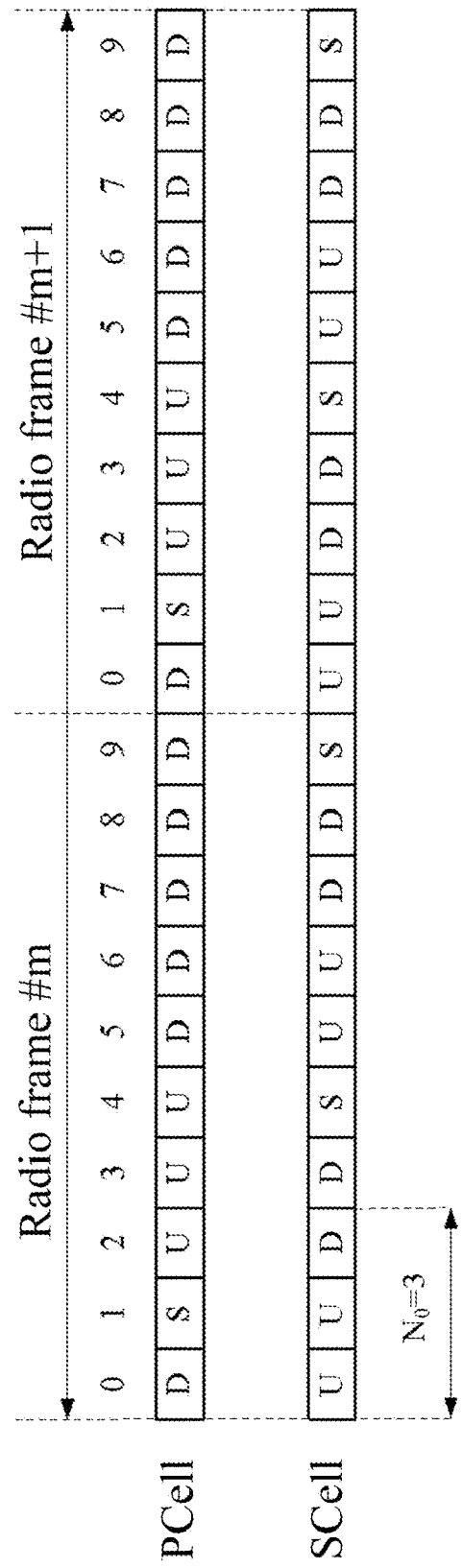
FIG. 18 is a schematic diagram of example 2 of embodiment 4 of the present disclosure.

In the example, as shown in FIG. 18, an uplink and downlink configuration of a PCell is #3, an uplink and downlink configuration of an SCell is #1, a terminal determines that subframe deviation N0 is 3 according to the uplink and downlink configuration of the PCell, and the terminal sends and receives information in the PCell and the SCell. Information sending and receiving processes of the terminal have been described in embodiment 2 and embodiment 3 in detail, and will not be elaborated herein.

From the above description, it can be seen that the present disclosure achieves the following technical effects: a corresponding feedback delay of a Carrier Aggregation TDD system may be effectively reduced, and the feedback delay of the Carrier Aggregation TDD system is equivalent to that of a carrier aggregation FDD system; and in addition, for the Carrier Aggregation FDD system, by the method, intercell interference may be effectively reduced, and transmission performance may be improved.

Apparently, those skilled in the art should know that each module or each step of the present disclosure may be implemented by a universal computing device, and the modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above description is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, according to the embodiments and preferred implementation modes, the multiple serving cells with the subframe deviations are aggregated to obtain the K PCells and the M SCells; and the transmission node transmits the information on the multiple aggregated serving cells according to the subframe deviations, so that a transmission delay may be reduced.

What is claimed is:

1. A Carrier Aggregation, CA, method for a communication system, comprising:
    aggregating multiple Time Division Duplex (TDD) serving cells with existence of subframe deviations to obtain K Primary Cells, PCells, and M Secondary Cells, SCells, wherein K and M are positive integers, wherein the subframe deviations comprise: corresponding subframe index difference values between the TDD serving cells under a same radio frame index, or difference values of subframes where synchronization channels are located between the multiple TDD serving cells; and
    transmitting, by a transmission node, information in the multiple TDD serving cells according to the subframe deviations.

2. The method according to claim 1, wherein existence of the subframe deviations comprises:
    existence of the subframe deviations between TDD serving cells with adjacent cell indexes in the multiple TDD serving cells: or
    existence of the subframe deviations between the multiple TDD serving cells and a fixed TDD serving cell, wherein the fixed TDD serving cell is a TDD serving cell in the multiple TDD serving cells.

3. The method according to claim 2, wherein the fixed TDD serving cell is one of: a TDD serving cell serving as a PCell, a TDD serving cell with a maximum subframe index and a TDD serving cell predefined by the transmission node.

4. The method according to claim 1, wherein the transmission node comprises a Node B and a terminal; transmitting, by the transmission node, information in multiple preset carriers according to the deviations comprises:
   transmitting, by the terminal, the information in the multiple TDD serving cells according to the subframe deviations; and/or
   performing, by the Node B, information scheduling in the multiple TDD serving cells according to the subframe deviations, and transmitting information according to scheduling.

5. The method according to claim 4, before transmitting, by the terminal, the information in the multiple TDD serving cells according to the subframe deviations, further comprising: acquiring, by the terminal, the subframe deviations according to at least one of:
   acquiring, by the terminal, the subframe deviations through signaling;
   acquiring, by the terminal, the subframe deviations by detecting locations of synchronization channels corresponding to the multiple TDD serving cells; and
   acquiring the subframe deviations by virtue of uplink and downlink configurations corresponding to the multiple TDD serving cells.

6. The method according to claim 5, wherein, when the subframe deviations are acquired by virtue of the uplink and downlink configurations corresponding to the multiple TDD serving cells, the subframe deviations comprise at least one of that:
   when the uplink and downlink configuration of a PCell is #0 and the uplink and downlink configuration of an SCell is #1, the subframe deviation is 3;
   when the uplink and downlink configuration of the PCell is #1 and the uplink and downlink configuration of the SCell is #0, the subframe deviation is 2;
   when the uplink and downlink configuration of the PCell is #2 and the uplink and downlink configuration of the SCell is #0, the subframe deviation is 2;
   when the uplink and downlink configuration of the PCell is #3 and the uplink and downlink configuration of the SCell is #6, the subframe deviation is 3;
   when the uplink and downlink configuration of the PCell is #4 and the uplink and downlink configuration of the SCell is 110, the subframe deviation is 2;
   when the uplink and downlink configuration of the PCell is #5 and the uplink and downlink configuration of the SCell is #0, the subframe deviation is 2;
   when the uplink and downlink configuration of the PCell is #6 and the uplink and downlink configuration of the SCell is #1, the subframe deviation is 3;
   when the uplink and downlink configuration of the PCell is #6 and the uplink and downlink configuration of the SCell is #0, the subframe deviation is 2;
   when the uplink and downlink configuration of the PCell is one of #0, #3 and #6, the subframe deviation is 3; and
   when the uplink and downlink configuration of the PCell is one of #1, #2, #4 and #5, the subframe deviation is 2.

7. The method according to claim 6, wherein transmitting, by the terminal, the information in the multiple TDD serving cells according to the subframe deviations comprises:
   under the condition that there are corresponding uplink subframes under each subframe index, if transmission of a Physical Downlink Shared Channel, PDSCH, corresponding to a Physical Downlink Control Channel/Enhanced-Physical Downlink Control Channel, PDCCH/EPDCCH, or a PDCCH/EPDCCH indicating Semi-Persistent Scheduling, SPS, release or no PDSCH corresponding to the PDCCH/EPDCCH is detected in PCell subframe n, or transmission of the PDSCH corresponding to the PDCCH/EPDCCH is detected in SCell subframe n, sending, by the terminal, a corresponding Hybrid Automatic Repeat Request-Acknowledgement, HARQ-ACK, in uplink subframe n+4, wherein
   when a PCell and SCell corresponding to subframe n+4 are both uplink subframes, the terminal sends the HARQ-ACK in the PCell;
   when the PCell corresponding to subframe n+4 is an uplink subframe and the SCell corresponding to subframe n+4 is a downlink subframe, the terminal sends the HARQ-ACK in the PCell; and
   when the SCell corresponding to subframe n+4 is an uplink subframe and the PCell corresponding to subframe n+4 is a downlink subframe, the HARQ-ACK is sent in the SCell.

8. The method according to claim 6, wherein transmitting, by the terminal, the information in the multiple TDD serving cells according to the subframe deviations comprises:
   when there are corresponding downlink subframes and uplink subframes under each subframe index, if Downlink Control Information, DCI, corresponding to transmission of a Physical Uplink Shared Channel, PUSCH, is detected in subframe n, transmitting, by the terminal, the PUSCH in subframe n+4, wherein selection of the TDD serving cell where the DCI is located comprises at least one of:
   when there is no cross-carrier scheduling configured and a carrier corresponding to the PUSCH transmitted in subframe n+4 has a downlink subframe in subframe n, transmitting the DCI in the same TDD serving cell as that of the PUSCH;
   when there is no cross-carrier scheduling configured and the carrier corresponding to the PUSCH transmitted in subframe n+4 does not have the downlink subframe in subframe n, transmitting the DCI in a different TDD serving cell from that of the PUSCH, and determining, by the terminal, the TDD serving cell where the DCI is located according to at least one of a timing deviation, an uplink and downlink proportion of aggregated TDD serving cells and high-layer signaling; and
   when cross-carrier scheduling is configured, determining the carrier where the DCI corresponding to the PUSCH is located according to configuration.

9. The method according to claim 6, wherein transmitting, by the terminal, the information in the multiple TDD serving cells according to the subframe deviations comprises:
   when there are corresponding downlink subframes and uplink subframes under each subframe index, sending, by the terminal, a PUSCH in subframe n, and detecting a Physical Hybrid ARQ Indicator or Channel, PHICH, corresponding to the PUSCH in subframe n+4, wherein selection of a TDD serving cell where the PHICH is located comprises at least one of:
   when there is no cross-carrier scheduling configured and a carrier corresponding to the PUSCH transmitted in subframe n has a downlink subframe in subframe n+4, transmitting the PHICH in the same TDD serving cell as that of the PUSCH;

when there is no cross-carrier scheduling configured and the carrier corresponding to the PUSCH transmitted in subframe n does not have the downlink subframe in subframe n+4, transmitting the PHICH in a different TDD serving cell from that of the PUSCH, and determining, by the terminal, the TDD serving cell where the PHICH is located according to at least one of a timing deviation, an uplink and downlink proportion of aggregated TDD serving cells and high-layer signaling; and when cross-carrier scheduling is configured, determining the carrier where the PHICH is located according to configuration.

10. The method according to claim 6, wherein transmitting, by the terminal, the information in the multiple TDD serving cells according to the subframe deviations comprises:

when there are corresponding downlink subframes and uplink subframes under each subframe index, detecting, by the terminal, a PHICH in subframe n, and if a PHICH feedback is a Negative Acknowledgement, NACK, sending a retransmitted PUSCH in subframe n+4, wherein selection of a TDD serving cell where the retransmitted PUSCH is located comprises at least one of:

when there is no cross-carrier scheduling configured and a carrier corresponding to the PHICH transmitted in subframe n has an uplink subframe in subframe n+4, transmitting the retransmitted PUSCH in the same TDD serving cell as that of the PHICH;

when there is no cross-carrier scheduling configured and the carrier corresponding to the PHICH transmitted in subframe n does not have the uplink subframe in subframe n+4, transmitting the retransmitted PUSCH in a different TDD serving cell from that of the PHICH, and determining, by the terminal, the TDD serving cell where the retransmitted PUSCH is located according to at least one of a timing deviation, an uplink and downlink proportion of the aggregated TDD serving cells and high-layer signaling; and when cross-carrier scheduling is configured, determining the carrier where the retransmitted PUSCH is located according to configuration.

11. The method according to claim 6, wherein transmitting, by the terminal, the information in the multiple TDD serving cells according to the subframe deviations comprises:

when there are corresponding uplink subframes under each subframe index, detecting, by the terminal, an uplink DCI format or random access response indication with a corresponding Channel State Information, CSI, triggering field set as trigger reporting in subframe n of TDD serving cell c, and sending aperiodic CSI reporting in the PUSCH corresponding to subframe n+4.

12. The method according to claim 6, wherein transmitting, by the terminal, the information in the multiple TDD serving cells according to the subframe deviations comprises: if there are corresponding uplink subframes under each subframe index:

when a PCell and SCell corresponding to subframe n are both uplink subframes, sending periodic CSI in the PCell;

when the PCell corresponding to subframe n is an uplink subframe and the SCell corresponding to subframe n is a downlink subframe, sending the periodic CSI in the PCell; and when the SCell corresponding to subframe n is an uplink subframe and the PCell corresponding to subframe n is a downlink subframe, sending the periodic CSI in the SCell, wherein periodic CSIs of various TDD serving cells are configured according to a period and offset corresponding to an FDD system.

13. The method according to claim 4, wherein performing, by the Node B, information scheduling in the multiple TDD serving cells according to the subframe deviations and transmitting the information according to scheduling comprises:

notifying, by the Node B, the subframe deviations; and performing, by the Node B, information scheduling in the multiple preset TDD serving cells and performing corresponding information transmission according to scheduling.

14. The method according to claim 13, wherein notifying, by the Node B, the subframe deviations comprises:

notifying, by the Node B, the terminal of the subframe deviations, and/or, notifying an adjacent Node B of the subframe deviations.

15. A Carrier Aggregation, CA, device for a communication system, comprising at least one computing device configured to execute program codes stored in a non-transitory storage device to performs steps in following modules:

an aggregation module, arranged to aggregate multiple Time Division Duplex (TDD) serving cells with existence of subframe deviations to obtain K Primary Cells, PCells, and M Secondary Cells, SCells, wherein K and M are positive integers, wherein the subframe deviations comprise: corresponding subframe index difference values between the TDD serving cells under a same radio frame index, or difference values of subframes where synchronization channels are located between the multiple TDD serving cells; and a transmission module, arranged to transmit information in the multiple TDD serving cells according to the subframe deviations.

16. The device according to claim 15, wherein existence of the subframe deviations comprises:

existence of the subframe deviations between TDD serving cells with adjacent cell indexes in the multiple TDD serving cells; or existence of the subframe deviations between the multiple TDD serving cells and a fixed TDD serving cell, wherein the fixed TDD serving cell is a TDD serving cell in the multiple TDD serving cells;

wherein the fixed TDD serving cell is one of: a TDD serving cell serving as a PCell, a serving sell with a maximum subframe index and a TDD serving cell predefined by a transmission node.

* * * * *